Figure 1:
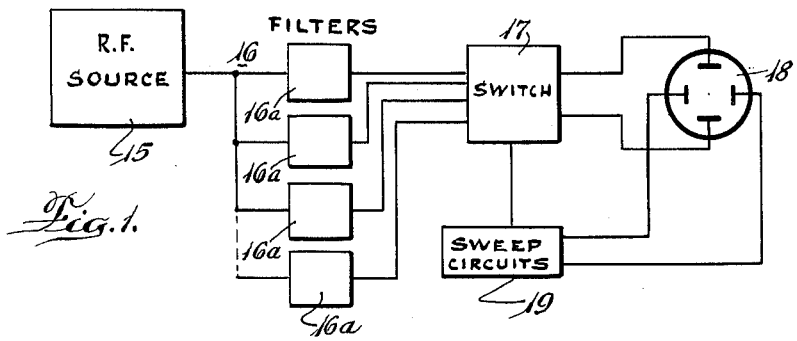

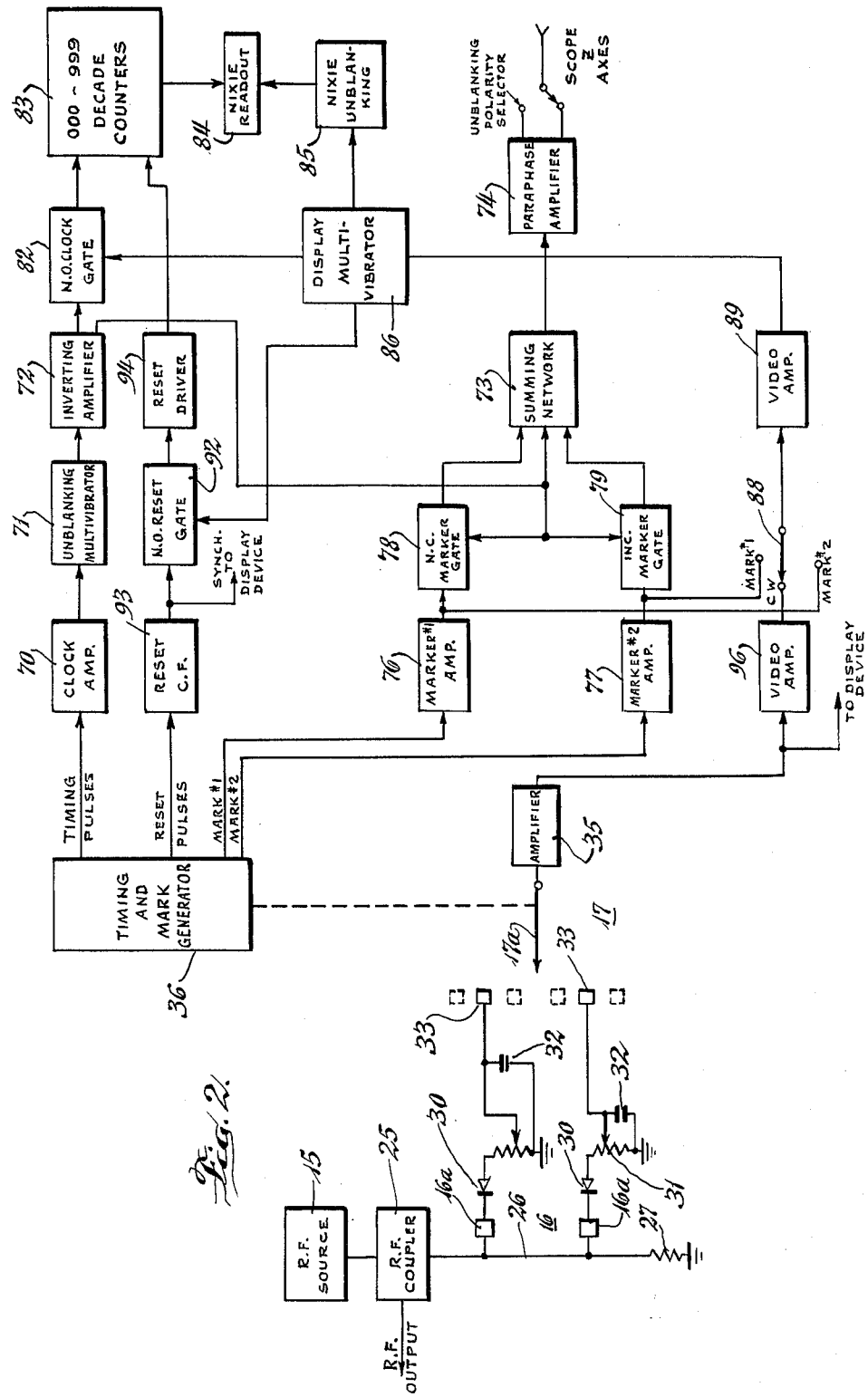

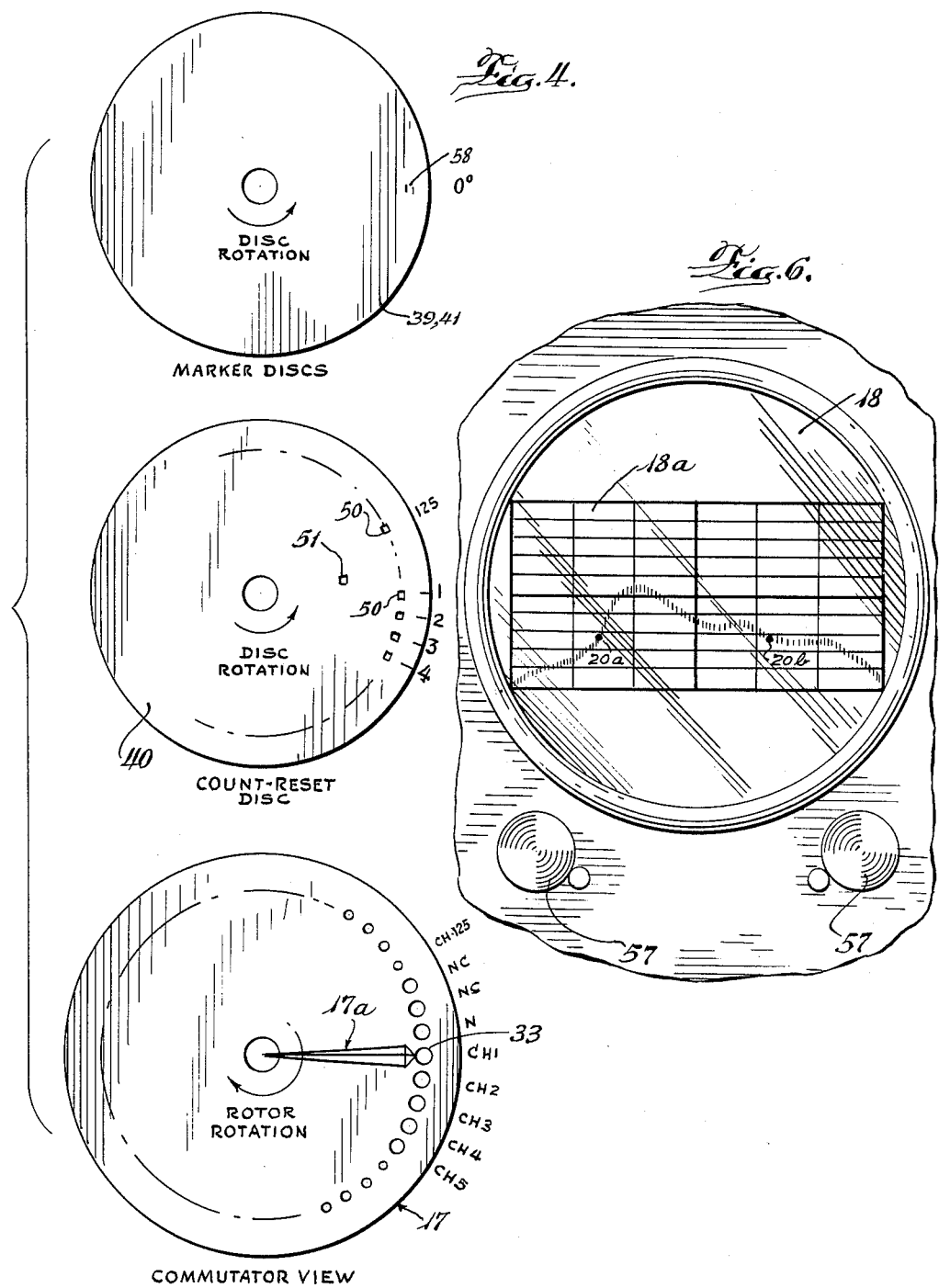

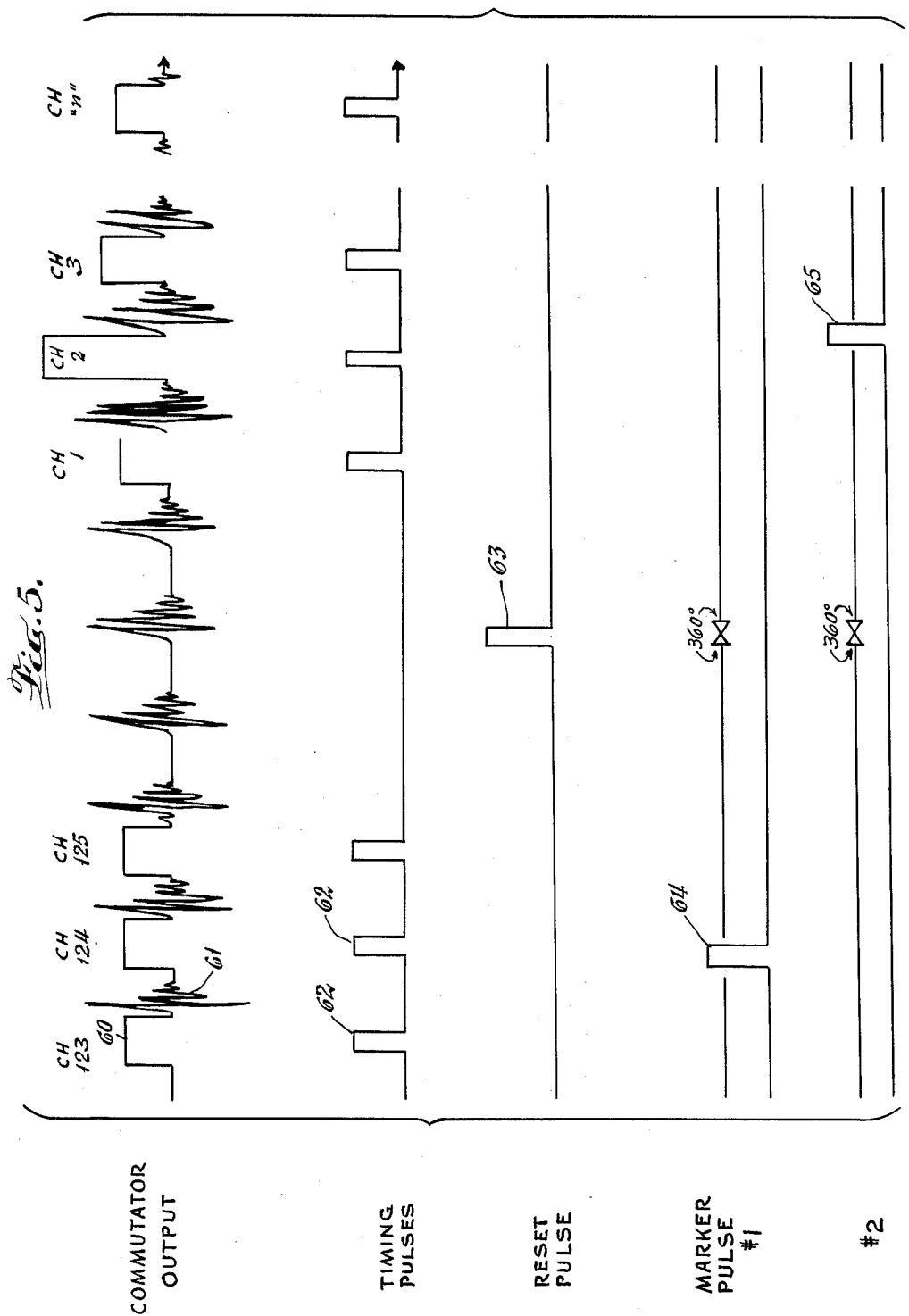

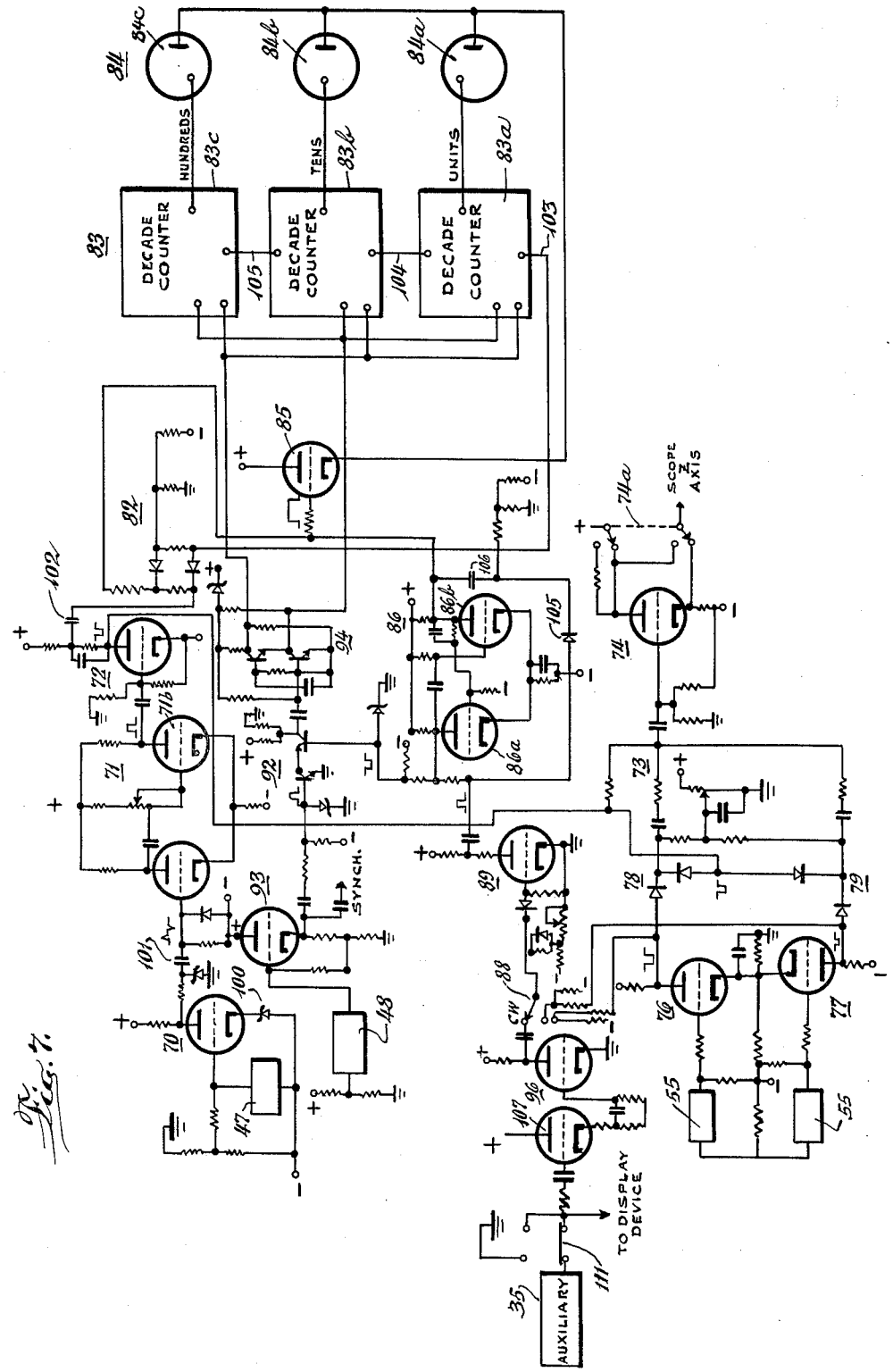

United States Patent Office 3,241,064
Patented Mar. 15, 1966

3,241,064
SPECTRUM ANALYZER INCLUDING MEANS FOR GENERATING A MARKER SIGNAL INDICATING A SELECTED FILTER CHANNEL
John H. Bartels, Chicago, Edward J. McGowan, Jr., Villa Park, and Conrad R. Montalto, Morton Grove, Ill., assignors to The Hallicrafters Co., a corporation of Delaware
Filed May 5, 1961, Ser. No. 108,005
8 Claims. (Cl. 324—77)

This invention relates to an apparatus for measuring and indicating the distribution of energy as a function of frequency throughout a wide band.

The accurate measurement of energy distribution in the output of a broad band radio transmitter is extremely difficult with present equipment and practices. For example, a broad band noise or random modulated oscillator may have an output covering a frequency band of over 1,000 megacycles, in the range of 2,000 to 4,000 megacycles. It is sometimes necessary to analyze this output to determine the distribution of energy throughout the band. One present means for accomplishing this makes use of a heterodyne receiver with a voltage variable local oscillator. The frequency of the local oscillator is varied by applying a periodic voltage thereto, tuning the receiver continuously over the desired band, while the output of the oscillator being measured is coupled to the receiver input. An output of the receiver is amplified and applied to a suitable display device, as a cathode-ray oscilloscope, which has a sweep synchronized with the tuning signal of the local oscillator. The resulting display gives a rough indication of energy distribution. However, this system has at least two serious drawbacks which limit its usefulness. The sensitivity of the receiver is not fixed, but varies depending upon the frequency of the local oscillator. Accordingly, the resulting display is not an accurate quantitative indication of relative signal strength or energy at different frequencies. Furthermore, the tuning range of the local oscillator is limited and often the entire spectrum of interest cannot be examined at one time.

A second commonly used measuring apparatus includes a tunable bandpass filter together with a detector and measuring instrument. The filter is tuned manually in small frequency increments and a reading made for each frequency. The readings must be corrected to compensate for the characteristics of the systems before the results have any meaning. At the high frequency levels particularly under consideration here, the bandpass filter may be a transmission-type wave meter. The correction factor varies with different frequency settings of the wave meter and a laborious and time-consuming series of computations is required to obtain the necessary data to plot a power distribution curve. Furthermore, a large number of measurements must be made in order to obtain adequate frequency resolution of the curve. The entire procedure is highly unsatisfactory.

A principal object of this invention is the provision of a novel spectrum analyzer which provides an accurate indication of the energy distribution over a broad spectrum.

One feature of the invention is the provision of apparatus including means for sampling the energy level at a plurality of spaced frequencies throughout the band of interest, means for establishing a signal representing an energy level at each of the frequencies, means for periodically selecting or sampling each of said signals and means for displaying the selected signals. Another feature is that the filters each have a rectifier and integrator connected therewith establishing a signal representing the average energy level at the frequency of each filter, and these signals are repetitively and sequentially selected and displayed.

A further feature is the provision of means for indicating frequency on the display device, as by providing a visual marker with an indication of the frequency of the marker.

Still another feature of the invention is that the display device may be a cathode-ray oscilloscope having deflection means with the selected signals applied to the deflection means and having scanning means synchronized with the selection of signals for display. Yet a further feature is the use of a rotary selector as a multi-position rotary selector switch, for selecting the signals from the filters, together with a display which is synchronized with the rotation of the selector switch.

And another feature is the provision of a signal-handling channel with gating means the operation of which is synchronized with the position of the selector switch so that the signal channel is conductive only when the switch is closed. This prevents the display of undesired noise.

Yet a further feature is the provision for a means for displaying a marker on the display device, as by intensifying the image at a selected point, and means for indicating the switch position corresponding with the marker, providing a measure of the frequency indicated by the marker.

And another feature of the invention is the provision of a frequency measuring apparatus including means for scanning a frequency band including the frequency of an unknown source, a peak detector connected with said scanning means, and means responsive to the peak detector for indicating the frequency of the major power output of the source.

Figure 3:
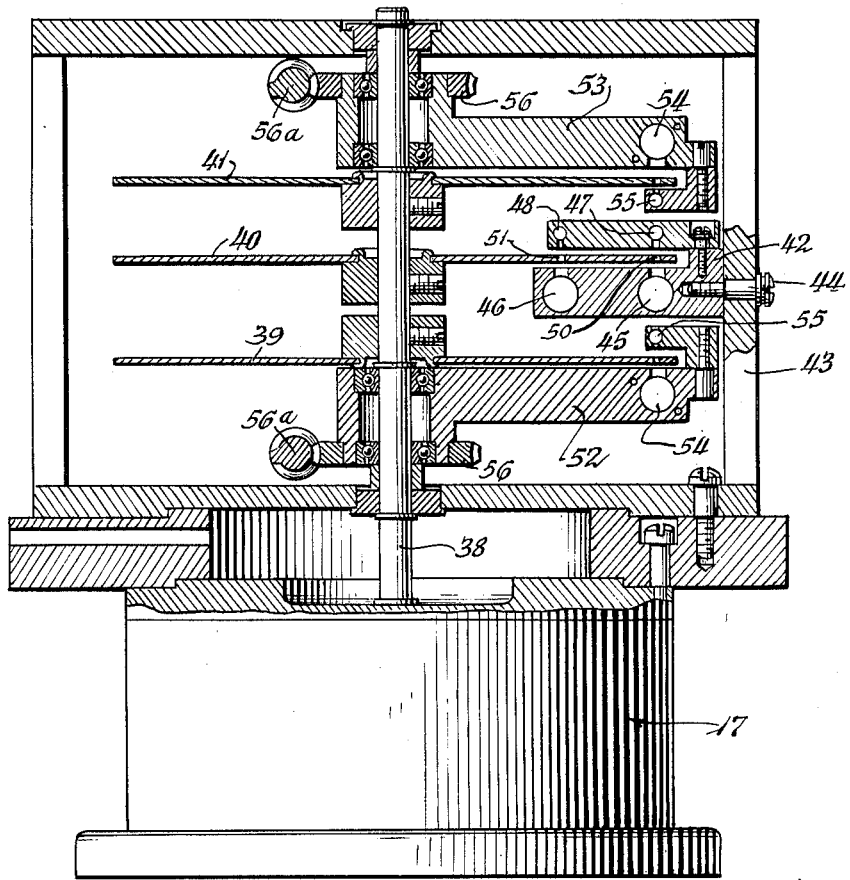

Further features and advantages of the invention will readily be apparent from the following specification and from the drawings in which:

FIGURE 1 is a basic block diagram of a system embodying the invention;
FIGURE 2 is a detailed block diagram of the system;
FIGURE 3 is a view, partially in section, illustrating the rotary selector switch and the associated synchronizing apparatus;
FIGURE 4 is a diagrammatic view of a portion of the synchronizing apparatus;
FIGURE 5 is a series of curves illustrating signals present in the system;
FIGURE 6 is a representative cathode-ray oscilloscope presentation provided by the apparatus; and
FIGURE 7 is a schematic circuit diagram of the synchronizing and control circuits.

It is often desirable to analyze the effect of various types of modulation on the energy distribution of an oscillator. The first method of measuring outlined above is so inaccurate that its results are of little or no quantative or even qualitative value. The laborious computations and plotting required with the second method render it practically useless for any extensive and rapid investigation of modulation characteristics. The apparatus disclosed and claimed herein provides a means for the rapid and accurate measurement of the energy distribution in a broad band or spectrum, and for the display of this information in a manner making the results of the measurement readily usable.

Turning now to the drawings, and more particularly to FIGURE 1, a radio frequency source 15 is shown, which may have an output covering a broad spectrum. An example of such a source is a voltage modulated traveling wave device marketed under the trademark "Carcinotron." The output of the source 15 is connected to a series 16 of filters 16a each passing a narrow band of frequencies, the group of filters covering the frequency spectrum of interest with the desired degree of resolution. For example, in a specific embodiment of the apparatus for the frequency band from 2,400 megacycles to 3,650 megacycles, the filter section may include 125 channels with a 10-megacycle spacing. The outputs of the filter sections, which are preferably integrated to provide an indication of average power, are coupled through a selector of commutator switch 17 to a display device, as to the vertical deflection plates of cathode-ray oscilloscope 18. Switch 17 sequentially selects each of the filter output signals, and couples the selected signal to the display device, the selection or commutation operation being repeated at a relatively rapid rate. The sweep circuitry for cathode-ray oscilloscope 18 is preferably synchronized with the operation of switch 17, so that the sweep starts with a selection of the lowest frequency channel of filter section 16, at the left of the screen of the oscilloscope. As the sweep progresses toward the right, increasingly higher frequency signals are selected by switch 17. This provides a display which is for all practical purposes equivalent to a plot of signal energy as a function of frequency.

A representative display is illustrated in FIGURE 6, where a grid 18a is superimposed over the face of the oscilloscope. The display illustrated in FIGURE 6 appears as a series of small dots across the face of the screen. As will be pointed out below, it is desirable because of noise problems to gate the display as the switch moves between channels causing the disconnected appearance of the display. Marker spots 20a and 20b are included in the display to facilitate the determination of the precise frequency at any point of the display, as will appear below.

The output of each filter section, which is preferably rectified and integrated, is essentially a D.C. potential and proper calibration of each of the filters provides a display which is quantitatively accurate throughout the entire range of the apparatus. The ordinate of the display may be calibrated directly in terms of watts.

The frequency capability of the measuring apparatus is limited only by the number of channels or positions of switch 17, and the frequency resolution desired, together with the physical dimensions of the display device. There is no strict frequency ratio limitation such as that which restricts the usable range of the first type of measuring apparatus described above where the local oscillator of superheterodyne receiver is swept across a frequency range being investigated. Furthermore, various filter sections may be provided covering different ranges, if desired.

The generation and calibration of frequency markers 20a and 20b will now be considered in more detail, along with further details of the over-all apparatus. In FIGURE 2, the radio frequency source 15 is shown connected with a radio frequency coupler 25. A portion of the radio frequency energy is derived from coupler 25 through a circuit 26 suitably terminated at 27. The major portion of the power from the source is directed to the RF output, which may be connected with an amplifier, an antenna, or other suitable load. The filters 16a are connected with circuit 26, there being a filter for each channel of the apparatus although only two are illustrated in FIGURE 2. The nature of the filter 16a may, of course, depend upon the frequency level of the portion of the spectrum of interest, and the degree of frequency resolution desired. For example, in an apparatus for analyzing the spectrum in the area of 2,500 to 3,500 megacycles, filter 16a may take the form of tuned cavities, while at lower frequencies, crystal filters may be used. Connected with each of the filters is a rectifier or detector 30, to which is connected a parallel resistance-capacitance circuit including a potentiometer 31 and capacitor 32 which are returned to the suitable reference potential as ground 33. A signal representing the average value of the energy passed by filter 16a appears across the capacitor 32, and is connected with a contact 33 of the selector or commutator switch 17. The potentiometers 31 may be adjusted to effect proper calibration of the apparatus, compensating for nonlinearities in radio frequency coupler 25 and connecting circuit 26.

Switch 17 may be of any suitable form, dependent on the signal levels and other characteristics of the spectrum being investigated, the number of channels required and the repetition rate of the display. In one specific apparatus, a mercury jet switch is utilized in which a narrow stream of mercury is sprayed from a rotating nozzle to complete a circuit sequentially with a series of fixed contacts 33. The particular structure of the commutator or selector switch forms no part of the present invention and is not illustrated in detail in the drawing. It is sufficient for the purposes of the invention to consider that the switch rotor 17a sequentially and repetitively makes contact with or selects the output of each of the filter channels connected with the source being investigated. The selected signals are coupled through an amplifier 35 to the vertical deflection plates of the display device. Suitable timing and marker signals are provided by a generator 36 the operation of which is synchronized with the rotation of switch rotor 17a. The timing pulses occur in synchronism with the establishment of connections between selector switch rotor 17a and each of the contacts 33 to which the filter output signals are connected. A reset pulse occurs once each cycle of operation, i.e. each revolution of the rotary selector switch 17. The purpose of this pulse will be described in detail below. The marker pulses, of which two are provided by the apparatus illustrated herein, may occur at any desired point throughout the frequency range of the apparatus.

The structure of the pulse generator 36 is best seen in FIGURES 3 and 4. The rotary selector or commutator switch 17 has a shaft 38 connected thereto which rotates with the rotor 17a of the switch. Mounted on shaft 38 are three discs 39, 40 and 41, each of which is provided with one or more light-transmitting apertures. A block 42 is adjustably mounted on frame 43 by a screw 44, and carries a pair of light sources 45 and 46, on one side of disc 40 with associated photosensitive elements 47 and 48 on the opposite side of the disc. A series of apertures 50 in disc 40 are passed between light source 45 and photocell 47 as the disc rotates, resulting in production of a series of pulses from photocell 47. These form the timing pulses corresponding with a "switch closed" condition of the commutator switch. A single aperture 51 is provided in disc 40, and passes between light source 46 and photocell 48, at the appropriate time to provide a reset pulse, following the end of one complete sampling of the outputs of the filters and prior to the initiation of a subsequent filter sampling cycle.

Associated with each of the marker discs 39 and 41, there is a carrier 52 and 53, each of which has a provision for mounting a light source 54 and photocell 55, on opposite sides of the respective discs. The carriers 53 are rotatable on shaft 38 and are provided with gears 55 meshing with worms 56 which are connected through drive cables with handwheels 57 on the front panel of the apparatus (FIGURE 6). Rotation of the handwheels changes the time of occurrence of the marker pulses relative to the position of shaft 38.

The correlation between the apertures of the discs and the commutator switch 17 is best seen in FIGURE 4. The switch is shown diagrammatically, with the rotor 17a making contact with the fixed terminal 33 associated with channel 1. Traveling in a clockwise direction, the rotor sweeps past the fixed contacts or terminals of all of the other channels of the apparatus, there being 125 channels in one embodiment of the apparatus. The apertures 50 in disc 40 correspond with each of the fixed terminals of the commutator switch and are positioned and dimensioned so that the timing pulses occur during only a portion of the period in which there is contact between the switch rotor 17a and the corresponding terminal 33.

The apparatus utilizes only 125 channels while switch 17 is provided with 128 equally spaced positions. During the period between the 125th channel and the start of a second cycle of operation, a reset pulse is generated by the passage of aperture 51 between light source 46 and photocell 48. Each of the marker discs 39 and 41 have only a single aperture 58, and as the light source and photocell may be moved to any angular position relative to the remainder of the apparatus, the marker pulse may be caused to occur at any desired point. The carrier 42 for the light sources and photocells associated with disc 40 may be adjusted in position on frame 43, to effect proper synchronism of the pulse generation with the position of switch rotor 17a.

The nature of the various pulses and their relation to each other is illustrated in FIGURE 5. In the first row, a typical signal at rotor 17a of the commutator switch is shown. The commutated average energy signals 60 for each of the channels are separated by periods of high amplitude noise 61. The timing or clock pulses 62 are preferably arranged to occur at about midpoint of the energy signals 60. In any event, the timing pulses 62 should not occur before the average energy signals have an opportunity to overcome the inherent time delay or lag in amplifier 35. Reset pulse 63 occurs during the period following the signal from channel 125 and before the signal from channel 1 on the next operative cycle of the apparatus. Marker pulses 1 and 2, indicated at 64 and 65, respectively, are adjustable in position throughout substantially 360 degrees so that they can introduce a marker into the display at any point in the frequency spectrum under consideration.

Referring again to the block diagram, FIGURE 2, the operation of the various control circuits will be described. The timing pulses from generator 36 are amplified in the clock amplifier 70 and trigger an unblanking multivibrator 71 which in turn drives an inverting amplifier 72. One output of amplifier 72 is coupled to a summing network 73 which drives a paraphase amplifier 74 that provides an unblanking output for the display presentation device, as oscilloscope 18. Signals of either positive or negative polarity are available at the output of amplifier 74 and may be applied to the grid or cathode, respectively, of the cathode-ray oscilloscope, brightening the display during the occurrence of the timing pulse. This serves a gating function and results in the appearance of only the desired signals 60 at the display device.

The marker pulses 64 and 65 are coupled from the generator 36 to amplifiers 76 and 77, respectively. The output of each of the amplifiers is gated by the timing pulse from inverting amplifier 72 in gating stages 78 and 79, respectively, the outputs of which are applied to summing network 73. On the occurrence of a marker pulse in time coincidence with a timing pulse, an unblanking potential of greater amplitude is generated, resulting in brightening of the selected or marked indication on the display device.

Timing pulses from inverting amplifier 72 are coupled through a clock gate 82 to decade counters 33. The counters 83 are connected with a visual indicator 84 as numerical display tubes sold by the Burroughs Corporation under the trademark "Nixie" and which may be arranged to provide a visual indication either by channel number correlated with the filter channels, or directly in megacycles. The visual indicator 84 is normally maintained in a blanked or nonindicating condition, and is unblanked by a suitable signal from unblanking amplifier 85, which is actuated by display multivibrator 86. A display selector switch 88 permits selection of either the "mark 1" or "mark 2" pulse from the output of amplifiers 76 and 77, and couples the pulse through video amplifier 89 to monostable multivibrator 86. The pulse triggers multivibrator 86, unblanking visual indicator 84. Thus, the display 84 is rendered visible at the occurrence of the marker pulse, indicating the channel number or frequency corresponding with occurrence of the pulse and the display marker. Signals from display multivibrator 86 are connected with reset gate 92 and clock gate 82. The display multivibrator signal shuts off the clock gate for a substantial period of time, preventing the decade counter from continuing the count, and maintaining the desired channel indication on display 84. The reset gate is actuated to prevent the transmission of a reset pulse to the counters during the frequency display.

The reset pulse from timing generator 36, which occurs between the sampling of the last channel or filter and the sampling of the first channel at the start of succeeding cycle of operation, is coupled through a cathode follower 93 and reset gate 92 to the driver 94 which is connected to decade counters 83. This signal operates to return the counters to their start position or condition, whether it be for counting by channel numbers or by frequency. A synchronizing signal for the display device is obtained from the reset pulse cathode follower 93. Two frequency markers will generally be visible on the display device, unless the marker pulse occurs between two timing pulses. However, the frequency indicated by counter readout 84 is dependent on the setting of switch 88.

Frequency display selector switch 88 has a third position in which it is connected with the output of an amplifier 96, connected with the signal amplifier 35. When the switch is so positioned, the RF energy level signals are coupled to video amplifier 89. Amplifier 89 functions as a peak detector and serves to trigger display multivibrator upon sampling of the channel with peak power. Thus, the apparatus may be used to indicate directly the frequency of an oscillator, without requiring complicated heterodyning systems or the use of calibration charts.

The apparatus disclosed provides an accurate display of the frequency distribution of energy from the source. The display responds rapidly to changes in energy distribution, permitting comparison of the distribution resulting from different modulation. Photographs may be made of the display to provide a permanent record.

The various timing and control circuits will now be described in more detail, with reference to the schematic circuit of FIGURE 7. During the course of this discussion, specific circuitry will be described. It is to be understood that this specific disclosure is intended merely as an illustration of an operative embodiment of the invention, and that many changes and modifications will readily be apparent to those skilled in the art.

The clock photocell 47, is connected with the control grid of clock amplifier 70, and with a suitable resistive bias network connected with the negative B supply. The cathode is returned through a Zener diode 100 to the negative supply, establishing the desired operating conditions. Amplified pulses are coupled from the plate of amplifier 70 through a differentiating network including capacitor 101, to trigger the monostable unblanking multivibrator 71. The positive going pulse corresponding with the leading edge of the timing pulse triggers the multivibrator and a positive going pulse is produced at the plate of the output stage 71b. A corresponding negative pulse is obtained at the plate of inverting amplifier 72. It is this negative pulse which is coupled to summing network 73. A similar negative pulse, although lower in amplitude, is coupled from the plate of amplifier 72 through capacitor 102 to the normally conducting clock gate 82, and through the clock gate to the input 103 of the units decade counter 83a. The units counter has an output which is connected at 104 with the tens decade counter 83b which in turn has an output connected at 105 with the hundreds decade counter 83c. Each of the counters has an output connected with the associated readout or display tubes 84a, 84b and 84c.

The marker pulses generated by photocells 55 are coupled to the control grids of the respective marker amplifiers 76 and 77 and negative pulses appear at the plates of the amplifiers, corresponding in time with the marker pulses. Marker pulses from amplifiers 76 and 77 are gated by the timing pulses in the negative "and" gates 78 and 79 and coupled to the summing network 73, where the marker pulses and timing pulses are combined, for application to the control grid of unblanking pulse amplifier 74. Either positive or negative pulses are available from amplifier 74, and the proper unblanking polarity for the display device is chosen by selector switch 74a.

The frequency readout selector switch 88 connects a selected signal with the control grid of amplifier 89, the plate of which is connected with monostable display multivibrator 86. The positive signal from the plate of amplifier 89 is applied through diode 105 and capacitor 106 to the anode of normally conducting section 86b of the multivibrator and thus to the control grid of section 86a. Section 86a is rendered conductive while section 86b is cut off. The resulting positive step at the plate of section 86b is applied to the control grid of the frequency display unblanking tube 85 and as a blocking signal to the clock gate 82. A negative step from the plate of section 86a is applied to reset gate 92. Thus, during the unblanked period of the frequency display, the operation of the counters ceases, and it is also impossible for a reset pulse to reset the counters. Following the unblanking period for the frequency indicators, which may last for a period greater than a scanning cycle, the frequency readout devices are turned off and the decade counters resume counting, although they no longer accurately indicate the channels being scanned. It is necessary for the cycle of operation to be completed and a reset pulse to reset the counters before a further accurate indication can be obtained. For this reason, the recovery time of the monostable display multivibrator 86 is made sufficiently long to prevent unblanking the indicator prior to resetting the counters.

The frequency indicated by one of the two markers may be determined by connecting the display multivibrator with either of the plates of marker pulse amplifiers 76 and 77. The two markers facilitate certain measurements and observations. For example, in determining the half power points of a generated frequency band, the two markers may be set by manipulation of handwheels 57 and the frequencies read sequentially from the counter display.

The video or channel information of amplifier 35 is coupled both to the display device and through a cathode follower 107 to amplifier 96. With selector switch 88 in C.W. position, the output of amplifier 96 is applied to a peak detector circuit 110. The detected peak signal is coupled through amplifier 89 to the display multivibrator 86. As pointed out above, with this setting of the apparatus, the readout device will indicate the frequency of the major energy component of the signal under consideration.

A zero check switch 111 is provided in the signal channel at the output of amplifier 35. When this switch is operated, the input to the display device is grounded, permitting adjustment of the direct coupled circuits in the display device to establish a desired zero reference level. A calibrate switch is incorporated into amplifier 35, which allows insertion of reference signals at the amplifier input. System sensitivity of the amplifier and the oscilloscope display device may be checked or adjusted with this switch.

In the specific embodiment of the system described herein, where the commutator switch has 128 positions, the rotor may be driven at a speed of 1800 revolutions per minute. The persistence of the oscilloscope is much greater than the period of a single display cycle. The timing pulse repetition rate is 3.84 kilocycles, having a period of approximately 0.26 millisecond and approximately 0.9 millisecond is available for the reset pulse, following the end of channel pulse 125 and prior to the beginning of pulse 1. The display time, i.e. the period of display multivibrator 86, is approximately 275 milliseconds and, as pointed out above, its recovery time is such that it cannot be retriggered until at least one reset operation has occurred.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. Display apparatus of the character described, comprising: a source of a plurality of signals to be displayed; a display device; means including a multi-position selector switch connected between said source of signals and said display device for periodically and repetitively sampling the signals to be displayed; means for scanning said display device, synchronized with said multi-position switch; means for generating a signal responsive to the position of said switch; adjustable means for displaying on said display device a marker corresponding with a selected switch position; and means responsive to said switch position signal and said marker position for indicating the switch position corresponding with said marker.

2. Apparatus of the character described for the analysis of energy distribution in a broad band radio signal, comprising: a source of radio signal to be analyzed; a plurality of bandpass filters connected with said source and tuned to discrete spaced frequencies throughout said band; a rectifier connected with each of said filters for rectifying signals passed thereby; an integrator circuit connected with each of said rectifiers for establishing a signal representing the average level of energy in each filter pass band; means including multi-position selector switch connected with said integrator circuits for periodically and repetitively sampling said average representing signals; a cathode ray oscilloscope having a deflection means; means for applying said sampled signals to said deflection means; means for scanning said oscilloscope in synchronism with operation of said multi-position switch; means for generating a series of pulses in synchronism with operation of said selector switch; means for counting said pulses; adjustable means for displaying a marker of a selected position on said display device; and means responsive to said marker display means and to said counting means for indicating the switch position corresponding with said marker.

3. Display apparatus of the character described, comprising: a source of a plurality of signals to be displayed; a display device; means including a multi-position selector switch connected between said source of signals and said display device for periodically and repetitively sampling the signals to be displayed; means for scanning said display device, in synchronism with sampling by said multi-position switch; means for generating pulses as a function of the movement from position to position of said selector switch; means for counting said generated pulses; adjustable means for displaying on said display device a marker corresponding with a selected switch position; indicia means for indicating the marker position; and means responsive to said pulse counting means and to said adjustable marker means for actuating said marker indicia means.

4. The display apparatus of claim 3 including means responsive to said selector switch for resetting said counter.

5. The display apparatus of claim 3 wherein said selector switch includes a rotating member, and means are coupled with said rotating member for generating said switch position pulses.

6. The display apparatus of claim 5 wherein means are coupled with said rotating member for generating a marker signal, said means including a portion adjustable in position with respect to said member.

7. Display apparatus of the character described, comprising: the source of a plurality of signals to be displayed; a display device; means including a rotating multi-position selector switch connected between said source of signals and said display device for periodically and repetitively sampling the signals to be displayed; means for scanning said display device in synchronism with sampling of said signals by said multi-position switch; a pulse generator connected with said switch and operative in synchronism therewith for generating timing pulses corresponding with the position of said switch, a reset pulse for each scan sequence of said switch and a marker pulse adjustable in time with respect to the scan sequence of said switch; a counter responsive to said timing pulses; means responsive to said reset pulse for resetting said counter; counter read-out means responsive to said counter and to said marker pulse for indicating the count of timing pulses corresponding with the marker pulse; and means responsive to said marker pulse for providing a visual mark on said display device.

8. Apparatus of the character described for measuring the frequency of an energy source, comprising: means including a multi-position selector switch connected with said source for scanning a band of frequencies, including the frequency of the source; means for generating a series of pulses corresponding with movement from position to position of said switch and including means for counting said pulses; a peak detector connected with said switch; means responsive to said peak detector and to said means for generating a series of pulses for indicating the frequency of said source and means for stopping said count in accordance with the output of said peak detector, said count indicating the switch position corresponding with the frequency of said source.

References Cited by the Examiner
UNITED STATES PATENTS

| | | | |
|---|---|---|---|
| 2,159,790 | 5/1939 | Freystedt et al. | 324—77 |
| 2,347,977 | 5/1944 | Van Lieshout | 334—33 X |
| 2,465,355 | 3/1949 | Cook | 324—77 |
| 2,476,445 | 7/1949 | Lacy | 324—77 X |
| 2,484,618 | 10/1949 | Fisher. | |
| 2,602,836 | 7/1952 | Foster et al. | 324—77 |
| 3,051,897 | 8/1962 | Peterson et al. | 324—77 |

WALTER L. CARLSON, *Primary Examiner.*

SAMUEL BERNSTEIN, *Examiner.*